United States Patent [19]

Arai et al.

[11] 4,366,364
[45] Dec. 28, 1982

[54] FLUX-CORED WIRE FOR USE IN GAS-SHIELDED ARC WELDING

[75] Inventors: Toshio Arai; Hidehiko Kanehira; Kazuo Ikemoto, all of Kamakura, Japan

[73] Assignee: Kobe Steel, Ltd., Kobe, Japan

[21] Appl. No.: 182,941

[22] Filed: Sep. 2, 1980

[30] Foreign Application Priority Data

Sep. 4, 1979 [JP] Japan .................................. 54-113840

[51] Int. Cl.$^3$ .............................................. B23K 35/22
[52] U.S. Cl. ................................. 219/146.24; 219/74; 219/137 WM; 219/145.22
[58] Field of Search ...................... 219/145, 22, 146.24, 219/145.22, 74, 137 WM

[56] References Cited

U.S. PATENT DOCUMENTS

| | | | |
|---|---|---|---|
| 3,097,979 | 7/1963 | Amsel et al. .......................... | 148/36 |
| 3,218,432 | 11/1965 | Peck .......................... | 219/146.24 X |
| 3,424,892 | 1/1969 | Wilcox .............................. | 219/137 |
| 4,282,420 | 8/1981 | Banks ........................ | 219/145.22 X |

Primary Examiner—R. R. Kucia

Attorney, Agent, or Firm—Oblon, Fisher, Spivak, McClelland & Maier

[57] ABSTRACT

A flux-cored wire for use in gas shielded arc welding wherein flux of the following composition (weight % with regard to the entire wire) is inserted as a core into a metallic casing and the whole hydrogen content (H) of the wire is defined as 15 ppm $\leq H \leq 139 + 440F$ ppm (F: the weight % of fluorine with regard to the entire wire):

| | |
|---|---|
| Metal fluoride (as fluorine) | 0.025–0.35% |
| preferably, | 0.025–0.27% |
| Metal carbonate | $\leq 0.5$ |
| One or more selected from Al, Ti, V and Ca | $\leq 0.75\%$ |
| TiO$_2$ | 3.5–7.4% |
| SiO$_2$ | $\leq 2.0\%$ |
| MgO and/or ZrO$_2$ | 0.03–1.2% |
| Al$_2$O$_3$ | $\leq 1.5\%$ |
| C | $\leq 0.15\%$ |
| Mn | 1.2–3.0% |
| Si | 0.3–1.2%. |

3 Claims, 8 Drawing Figures

FLUX-CORED WIRE FOR USE IN GAS-SHIELDED ARC WELDING

BACKGROUND OF THE INVENTION

1. Field of the Invention

This invention relates to a flux-cored wire for use in gas-shielded arc welding, and more particularly to a flux-cored wire for automatic or full-automatic welding which meets all requirements for weldability, bead contour and joint strength.

2. Description of the Prior Art

Wires for use in gas shielded arc welding and especially for carbon dioxide shielded arc welding have become more and more prevalent, which satisfy a recent demand for highly efficient and inexpensive welding. Typical prior art wires are disclosed in U.S. Pat. Nos. 3,424,892 to Wayne L. Wilcox and 3,097,979 to Francis E. Amsel et al. Disadvantages of those wires, however, are poor bead appearance, unsatisfactory fatigue strength due to a convex bead shape, increased spatter loss, etc. Hand welding rods should be used under the siutation where these disadvantageous are of serious importance. The MIG and MAG welding techniques using an inert gas such as Ar or He or a mixture of such an inert gas and $CO_2$ and welding techniques using flux-cored wires have been proposed in the art of welding, aiming at improvements in bead contour and weldability. Such an inert gas is too expensive with too high a resulting welding cost for conventional welding.

While a considerable amount of effort has been devoted to improve the performance of flux-cored wires, these flux-cored wires still have the following shortcomings. As a rule, the flux-cored wires are classified into the basic type and acidic type according to the basicity of slags. The basic type generally includes a great deal of calcium fluoride and a low content of diffusible hydrogen, e.g. 1-3 mg/100 g, with the former being contributive to excellent physical properties of metal deposits and the latter contributive to excellent resistance to weld cracks. However, similar hand welding rods containing fluxes of the basic type shows a tendency for the slag to fall in drops and the bead to become convex with an increased amount of spattering and fuming. The acidic type, on the other hand, advantageously contains titania as its major ingredient so that the resulting bead assumes a desirable shape and appearance with a minimum of spattering. However, since the metal deposit normally contains a relatively large amount of diffusible hydrogen on the order of 8-15 ml/100 g, resistance to welding cracks is poor and pitting and porosity such as blowholes easily develop especially in welding applications to mill scales and heavily rusted steel sheets.

In case of low hydrogen welding rods, the welding rods are baked or otherwise treated for drying in the couse of manufacturing of the rods or immediately before its use in order to lower the content of diffusible hydrogen in the metal deposit. The flux-cored wires are similarly subject to such reforming treatment. However, baking demands a large expenditure of labor and fuel costs and impairs rust resistance of the wires. A special package or a rustproof painting is required as a measure of preventing rust. Conversely, if the hydrogen content of the wires is suppressed below 10-15 ppm, then baking or other thermal treatments will become necessary.

SUMMARY OF THE INVENTION

In light of the foregoing circumstances, the present invention is directed toward a titania system flux-cored wire for use in gas shielded arc welding, in an attempt to improve its undesirable properties, particularly poor resistance to weld cracks while enjoying its advantageous features including a high degree of weldability and excellent shape and bead appearance. As a consequence, the composition of flux and whole hydrogen content of a wire as defined below are successful in achieving the above objects as taught by the present invention.

In other words, the crux of a flux-cored wire for gas-shielded arc welding according to the present invention resides in that the fact flux of the following composition (weight % with regard to the entire wire) is inserted as a core into a metallic casing and the whole hydrogen content (H) of the wire is defined as 15 ppm$\leq$H$\leq$(139+440F) ppm (F: the weight % of fluorine with regard to the entire wire weight):

| | |
|---|---|
| Metal fluoride (as fluorine) | 0.025–0.35% |
| | preferably, 0.025–0.27% |
| Metal carbonate | $\leq$0.5% |
| One of more selected from | $\leq$0.75% |
| Al, Ti, Zr, V and Ca | |
| $TiO_2$ | 3.5–7.4% |
| $SiO_2$ | $\leq$2.0% |
| MgO and/or $ZrO_2$ | 0.03–1.2% |
| $Al_2O_3$ | $\leq$1.5% |
| C | $\leq$0.15% |
| Mn | 1.2–3.0% |
| Si | 0.3–1.2% |

(Should the metallic casing contain C, Mn, Si, Al, Ti, Zr, V or Ca of the above defined ingredients, it is understood that the above contents contain those ingredients in the metallic casing.)

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
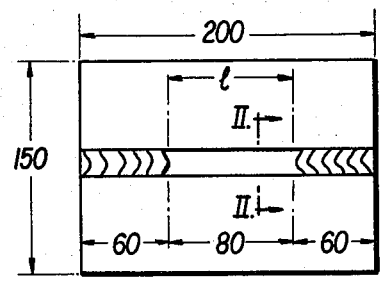
FIGS. 1 and 2 are schematic diagrams for explanation of a typical groove in a sample used in Y-shaped slit crack tests.

The composition of the flux and the hydrogen content of the wire are briefly discussed in the foregoing description. The effects of the respective ingredients of the flux filled as a core will now be clarified together with the reasons why their contents are so specified.

As is well known, as one of many steelmaking reactions, metal fluorides have the effect of accelerating removal of the hydrogen in hot metal and molten slag and especially exhibit an excellent dehydrating effect in their acid region where the viscosity of the slag is low. The results of the experiments in connection with the present invention as depicted later indicate that, while the content of diffusible hydrogen in the metal deposit increases with an increase in the whole hydrogen content of the wire, the addition of fluorides largely curbs increase of the diffusible hydrogen, thus ensuring crack resistance and an anti-porosity property of a weld zone. At least 0.025% metal fluoride as fluorine (by weight % with respect to the entire wire weight) is necessary in order to keep the addition of the fluorides in effect. An excessive amount of the fluorides sharply lowers the viscosity of the slag and deteriorates bead contour and also decreases weldability with increased amounts of spattering and fuming. It is therefore essential to limit the fluoride content as fluorine below 0.35%. A content of less than 0.27% of the fluorides secures further improvements in bead contour and arc stability. The most desirable metal fluorides are alkali metal fluorides such as LiF and NaF and alkaline earth metal fluorides such as $CaF_2$ and $BaF_2$ and these fluorides may be used alone or in combination for the purpose of the present invention. Preferably, the alkali metal fluorides further secure arc stability because of high electrical conductivity of fluoride ions and their ionization potential is higher than that of other compounds.

An appropriate amount of metal carbonate may enhance the ductility of the metal deposit by forming delicate droplets by the use of gas pressure originating from thermal decomposition and incrementing the basicity of the slag. Excessive metal carbonate results in abrupt fluctuations in the metal deposit, a deceased viscosity of the slag and deterioration in bead contour. The metal carbonate content should be 0.5% or less. A proper metal carbonate is carbonate mineral including calsite ($CaCO_3$), dolomite ($CaCO_3 \cdot MgCO_3$), magnesite ($MgCO_3$), rhodochrosite ($MnCO_3$), etc.

While Al, Ti, Zr, V and Ca are effective as strong deoxidizers, an amount of these deoxidizers exceeding 0.75% may give rise to a decline in crack resistance and the porosity ratio of the metal deposit. Accordingly, these dioxidizer contents should be 0.75% or less. It is understood that these dioxidizing metals may be used alone or in combination with others.

$TiO_2$ is a major ingredient of a slag forming agent in titania system fluxes and an essential ingredient to improvements in cover and exfoliation of the slag and arc stability. At least 3.5% $TiO_2$ is necessary. On the other hand, if the $TiO_2$ content is too large, the arc is widely spread with insufficient weld penetration. This results in drawbacks such as slag inclusion and poor separability of the slag. The $TiO_2$ content should be thus 7.4% or less.

$SiO_2$ may be a replacement for part of the above mentioned $TiO_2$ as a slag forming agent and has the function of improving bead contour and slag exfoliation. An excessive amount of $SiO_2$ may increase spattering and decrease the separability of the slag. The $SiO_2$ content should be 2.0% or less.

The effect of $Al_2O_3$ is to form a slag with relatively small flowability and better bead contour. In the case where the $Al_2O_3$ content is above 1.5%, the slag becomes easily hardened with a low separability of the slag. A large amount of $Al_2O_3$ often remains in the metal deposit with a possible decline of notch ductility.

MgO and $ZrO_2$ are high melting point oxides which are effective in obtaining a minimum decline of the viscosity of the slag in the presence of the metal fluoride and the metal carbonate as well as ensuring improved bead contour and better separability of the slag. A greater than 0.03% content of MgO and $ZrO_2$ is required for these effects. Contrarily, its required upper limit is 1.2% due to the fact that failure to meet such upper limit results in hardening and solidifying of the slag in a too short period of time to improve bead contour and separability of the slag.

In order for C, Si and Mn to refine the metal deposit as deoxidizers and the exhibit required physical properties as alloying elements, C content is $\leq 0.15\%$, Si is 0.30–1.20% and Mn is 1.20–3.00%. It is noted that these contents are determined due to the fact that some amount of these ingredients forms the slag. A very low content of C is an element useful in enhancing the strength of the metal deposit and is typically in a range ($\leq 0.15\%$) where there is no hardening cracks nor any drop in notch ductility. More than 0.8% Si and more than 1.2% Mn are necessary as deoxidizers and alloy elements. Si is an element which forms a ferrite and should be less than 1.20% so as to not develop any ferritic grain or decrease notch ductility. On the other hand, Mn is an element which forms an austenite and therefore should be less than 3.0% to prevent any hardening cracks.

According to the present invention the metallic casing contains the flux of the above defined composition as a core. The whole hydrogen content (H) of the flux-cored wire is specified as 15 ppm $\leq H \leq (139+440F)$ ppm (wherein F is the weight % of fluorine with regard to the entire wire weight). In order to ensure satisfactory resistance to cracks, it is necessary to keep the diffusible hydrogen content of the metal deposit below 10 ml/100 g. As will be more fully understood from a consideration of the inventors' experiments discussed hereinafter, it is therefore mandatory that the whole hydrogen content of the wire be within the above specified range in consideration of the dehydrating effect of the metal fluoride. In the event that the whole hydrogen content exceeds the above specified range, the content of the diffusible hydrogen in the metal deposit can not be as small as required even when a desired amount of the metal fluoride is added to the flux, with unsatisfactory resistance to cracks and porosity therefore resulting.

Material for the metallic casing should be selected depending on the kind of a base metal and is optionally selectable from mild steels, a wide variety of alloy steels, etc. without any particular limitation. The quantitative ratio of the flux to the metallic casing is subject to no particular limitation and is typically 10–30 weight % flux as a core.

As stated above, the present invention provides flux-cored wire which offers satisfactory results in bead contour, weldability and joint performance as well as the elimination of the need for baking, through the use of the titania system flux as a core wherein a desired amount of the metal fluoride is contained and the whole hydrogen content of the wire is limited in relation to the fluoride content.

Whereas the structure, function and advantages of the present invention will be discussed in terms of specific embodiments thereof, the following description is not intended to limit the present invention thereto as per the appended claims. It is obvious that many modifications and changes in flux composition, etc. are possible and should be interpreted as falling within the scope the appended claims.

EXAMPLE

A flux of the composition as indicated in Table 1 was filled with 15% per wire weight within a soft steel casing (ingredients: C 0.08% and Mn 0.42% and Si 0.02%), thus completing sample wires (1.6 mmφ). The whole hydrogen content in Table 1 designates the content of potential hydrogen in the wire and especially the content of hydrogen extracted during heating in Ar at 2200° C. for 90 seconds. Adjustment of the whole hydrogen content is accomplished by adding calcium soap to a lubricant based on lime and graphite.

Figure 2:
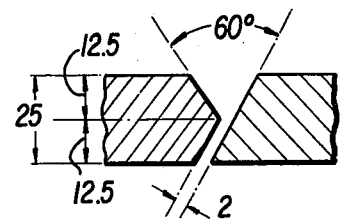

Using the resulting sample wires and SM-50A as a base metal, performance tests were conducted on metal deposits pursuant to JIS Z-3312 and JIS Z-3104 and Y-shaped slit crack tests pursuant to JIS Z-3158. FIGS. 1 and 2 depict the shape of a typical groove in specimens used in the Y-shaped slit crack tests, wherein FIG. 1 is a plan view and FIG. 2 is a cross sectional view taken along the line II—II in FIG. 1. Weld tests were conducted across the length l.

The chemical composition and physical properties of the resulting weld deposits are enumerated in Table 2 together with the results of X-ray performance tests. The diffusible hydrogen content in Table 2 was evaluated from the method pursuant to JIS Z-3113.

TABLE 1

| Ingredient | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Composition of flux (weight % per wire weight) | | | | | | | | | | | | | | | | | |
| Metal fluoride | $CaF_2$ | | | | | 0.025 | 0.025 | 0.025 | 0.025 | 0.13 | 0.13 | 0.13 | 0.13 | 0.30 | 0.30 | 0.30 | 0.30 |
| Metal carbonate | $CaCO_3$ | | | | | 0.03 | 0.03 | 0.03 | 0.03 | 0.08 | 0.08 | 0.08 | 0.08 | 0.20 | 0.20 | 0.20 | 0.20 |
| Dioxidizer | C | 0.08 | 0.08 | 0.08 | 0.08 | 0.08 | 0.08 | 0.08 | 0.08 | 0.08 | 0.08 | 0.08 | 0.08 | 0.08 | 0.08 | 0.08 | 0.08 |
| (alloy element) | Mn | 2.45 | 2.45 | 2.45 | 2.45 | 2.45 | 2.45 | 2.45 | 2.45 | 2.45 | 2.45 | 2.45 | 2.45 | 2.45 | 2.45 | 2.45 | 2.45 |
| | Si | 0.70 | 0.70 | 0.70 | 0.70 | 0.70 | 0.70 | 0.70 | 0.70 | 0.70 | 0.70 | 0.70 | 0.70 | 0.70 | 0.70 | 0.70 | 0.70 |
| Strong dioxidizer | Al | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Slag forming agent | $TiO_2$ | 6.0 | 6.0 | 6.0 | 6.0 | 5.6 | 5.6 | 5.6 | 5.6 | 5.4 | 5.4 | 5.4 | 5.4 | 5.2 | 5.2 | 5.2 | 5.2 |
| | $SiO_2$ | 0.6 | 0.6 | 0.6 | 0.6 | 0.6 | 0.6 | 0.6 | 0.6 | 0.7 | 0.7 | 0.7 | 0.7 | 0.8 | 0.8 | 0.8 | 0.8 |
| | $Al_2O_3$ | 0.7 | 0.7 | 0.7 | 0.7 | 0.7 | 0.7 | 0.7 | 0.7 | 0.7 | 0.7 | 0.7 | 0.7 | 0.7 | 0.7 | 0.7 | 0.7 |
| | MgO | 0.1 | 0.1 | 0.1 | 0.1 | 0.3 | 0.3 | 0.3 | 0.3 | 0.4 | 0.4 | 0.4 | 0.4 | 0.4 | 0.4 | 0.4 | 0.4 |
| | $ZrO_2$ | 0.1 | 0.1 | 0.1 | 0.1 | 0.3 | 0.3 | 0.3 | 0.3 | 0.3 | 0.3 | 0.3 | 0.3 | 0.3 | 0.4 | 0.4 | 0.4 |
| Iron and iron filing | | balance | balance | balance | balance | balance | balance | balance | balance | balance | balance | balance | balance | balance | balance | balance | balance |
| Whole hydrogen content | | 32 | 48 | 83 | 110 | 37 | 93 | 154 | 176 | 46 | 95 | 153 | 182 | 42 | 85 | 147 | 184 |

TABLE 2

| Performance | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Performance of metal deposits | | | | | | | | | | | | | | | | |
| Chemical composition (weight %) | | | | | | | | | | | | | | | | |
| C | 0.08 | 0.07 | 0.08 | 0.08 | 0.07 | 0.08 | 0.08 | 0.08 | 0.08 | 0.07 | 0.08 | 0.07 | 0.08 | 0.07 | 0.07 | 0.07 |
| Mn | 1.34 | 1.33 | 1.32 | 1.33 | 1.29 | 1.30 | 1.30 | 1.28 | 1.24 | 1.24 | 1.26 | 1.25 | 1.23 | 1.22 | 1.22 | 1.23 |
| Si | 0.52 | 0.54 | 0.54 | 0.51 | 0.48 | 0.49 | 0.47 | 0.47 | 0.44 | 0.43 | 0.44 | 0.45 | 0.42 | 0.44 | 0.41 | 0.40 |
| P | 0.011 | 0.012 | 0.012 | 0.013 | 0.010 | 0.013 | 0.012 | 0.012 | 0.012 | 0.011 | 0.011 | 0.013 | 0.012 | 0.013 | 0.012 | 0.012 |
| S | 0.015 | 0.013 | 0.015 | 0.016 | 0.014 | 0.015 | 0.015 | 0.014 | 0.018 | 0.016 | 0.014 | 0.014 | 0.014 | 0.015 | 0.014 | 0.014 |
| Al | 0.025 | 0.024 | 0.022 | 0.020 | 0.022 | 0.021 | 0.020 | 0.019 | 0.020 | 0.020 | 0.018 | 0.018 | 0.020 | 0.019 | 0.018 | 0.018 |
| Diffusible hydrogen content (ml/100 g) | 7.5 | 9.5 | 11.3 | 13.6 | 4.8 | 7.9 | 10.4 | 10.9 | 3.6 | 5.2 | 8.4 | 9.7 | 2.4 | 4.1 | 6.2 | 7.6 |
| Physical property | | | | | | | | | | | | | | | | |
| Tensile strength ($Kg/mm^2$) | 59.8 | 59.1 | 60.2 | 61.0 | 57.5 | 57.0 | 57.2 | 56.9 | 55.8 | 56.2 | 55.5 | 56.7 | 54.6 | 54.9 | 55.0 | 53.9 |
| Yield point ($Kg/mm^2$) | 50.4 | 49.8 | 50.3 | 50.5 | 48.7 | 48.6 | 50.1 | 49.2 | 47.7 | 46.8 | 46.8 | 47.0 | 46.6 | 46.7 | 45.9 | 45.8 |
| Elongation (%) | 26 | 26 | 25 | 25 | 32 | 31 | 30 | 27 | 31 | 30 | 29 | 27 | 30 | 30 | 29 | 29 |
| Reduction of area (%) | 67 | 66 | 63 | 63 | 71 | 71 | 68 | 66 | 70 | 71 | 68 | 66 | 71 | 71 | 68 | 68 |
| Charpy 2 mm V-side notch impact resistance (Kg-m) temperature 0° C.   1 | 9.1 | 6.4 | 5.4 | 4.9 | 9.8 | 8.6 | 6.7 | 6.1 | 10.2 | 8.4 | 7.5 | 9.0 | 10.8 | 12.8 | 7.6 | 7.5 |
| 2 | 10.3 | 5.0 | 5.4 | 5.6 | 9.2 | 7.4 | 5.7 | 5.8 | 12.5 | 12.7 | 7.6 | 6.0 | 9.1 | 13.1 | 7.4 | 6.9 |
| 3 | 10.0 | 6.0 | 4.7 | 5.5 | 10.6 | 7.6 | 6.0 | 5.6 | 12.0 | 10.5 | 6.1 | 5.8 | 10.8 | 11.8 | 8.6 | 6.9 |
| Av. | 9.8 | 5.8 | 5.2 | 5.3 | 9.9 | 7.9 | 6.1 | 5.8 | 11.6 | 10.5 | 7.1 | 6.9 | 10.2 | 12.6 | 7.9 | 7.1 |
| X-ray (JIS Grade) | 1 | 1 | 2 | 3 | 1 | 1 | 1 | 2 | 1 | 1 | 1 | 1 | 1 | 1 | 1 | 1 |

(Welding conditions)
Welding current: 320 A
Welding voltage: 32 V
Polarity: DC-RP
Atmosphere gas: $CO_2$, 20 l/min
Base metal temperature: 15° C. (room temperature)

Figure 3:
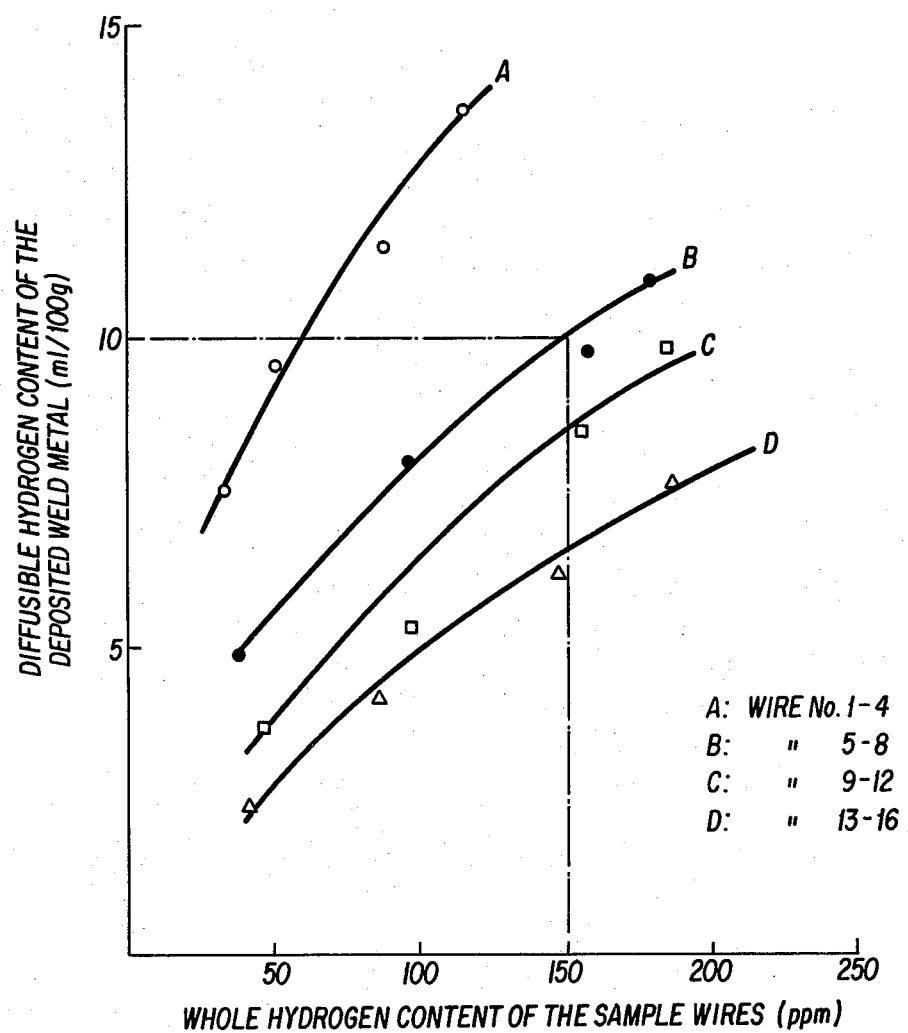
FIG. 3 is a graph showing the relationship between the whole hydrogen content of wires and the diffusible hydrogen content of metal deposits.

The relationship between the whole hydrogen content of the sample wires and the diffusible hydrogen content of the resulting metal deposits is depicted in FIG. 3.

It is evident from the results of the tests that with sample fluxed-wires Nos. 1-4 containing no metal fluoride it was impossible to keep the diffusible hydrogen content of the resulting metal deposits below 10 ml/100 g without limiting the whole hydrogen content of the wire to a considerably low level (typically, less than about 50 ppm), whereas the wires according to the present invention makes possible keeping the diffusible hydrogen content of the metal deposits below 10 ml/100 g even when the whole hydrogen content is at a considerably high level.

Figure 4:
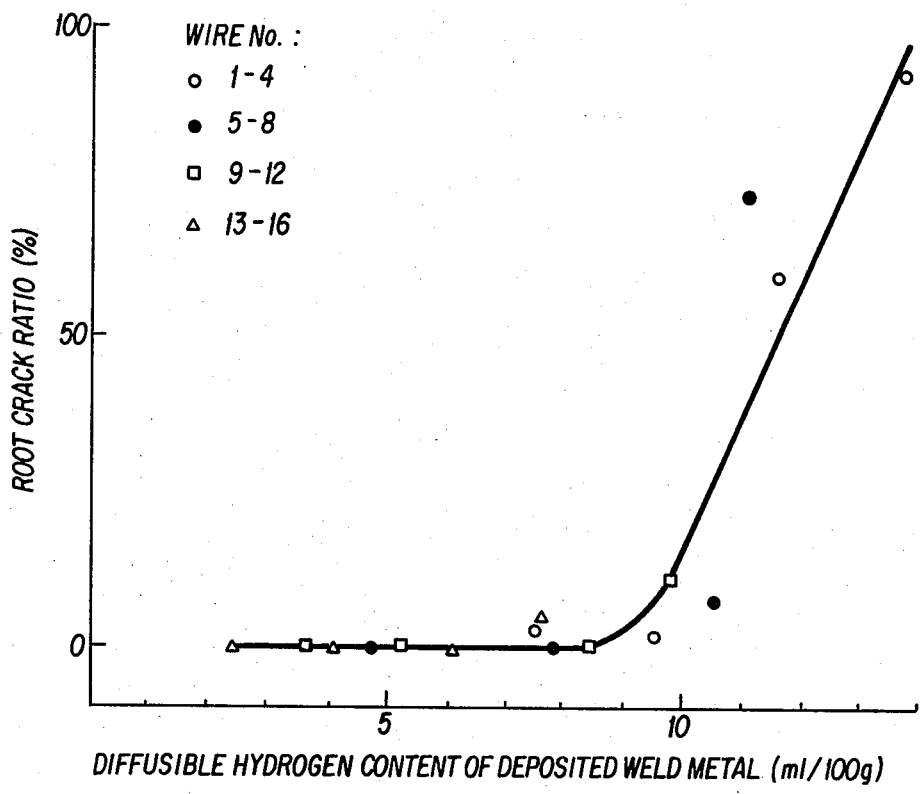
FIG. 4 is a graph showing the relationship between the diffusible hydrogen content of the metal deposits and root crack ratio.

FIG. 4 is a graph indicating the relationship between the diffusible hydrogen content of the metal deposits and the root crack ratio in the Y-shaped slit crack tests. It is clear from FIG. 4 that a diffusible hydrogen content of less than 10 ml/100 g allows for complete elimination of cracks.

Figure 5:
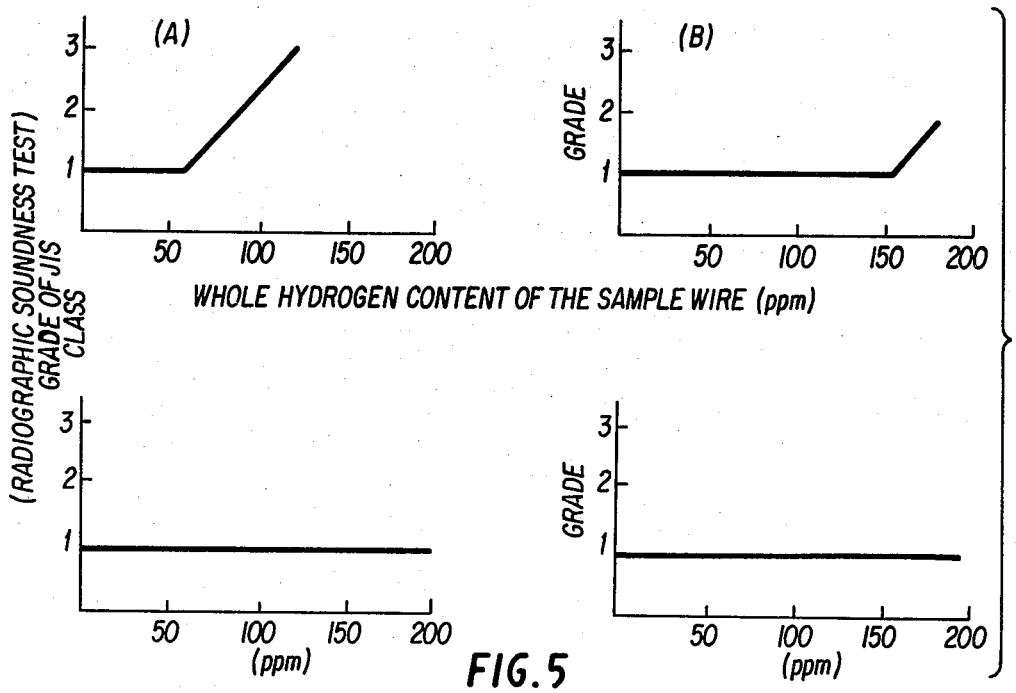
FIGS. 5(A)–5(D) are graphs depicting the results of X-ray performance tests.

FIGS. 5(A) to 5(D) depict the relationship between the whole hydrogen content of the sample wires and the results of the X-ray tests wherein FIG. 5(A) indicates the results of the X-ray tests on wires Nos. 1–4 (no metal fluoride added), FIG. 5(B) on wires Nos. 5–8 (0.025% metal fluoride), FIG. 5(C) on wires Nos. 9–12 (0.13% metal fluoride) and FIG. 5(D) on wires Nos. 13–16 (0.30% metal fluoride). In FIGS. 5(A) to 5(D), the numbers on the ordinate indicate the grade of JIS Class I under radiographic soundness test and those on the abscissa the whole hydrogen content (ppm) of the wires.

It is appreciated that for the sample wires containing no metal fluoride keeping the whole hydrogen content below about 50 ppm is necessary in order to secure X-ray performances on the order of JIS Class I as indicated in FIG. 5(A), while the sample wires containing desired contents of the metal fluoride provide excellent X-ray performances even with the whole hydrogen content ranging from 150 to 200 ppm as indicated in FIGS. 5(B) to 5(D).

What is claimed as new and desired to be secured by Letters Patent of the United States is:

1. A flux-cored wire for gas shielded arc welding comprising a flux of the following composition filled as a core within a metallic casing:

| | |
|---|---|
| Metal fluoride as fluorine | 0.025–0.35 (wt %) |
| Metal carbonate | $\leq 0.5$ |
| One or more selected from the group consisting of Al, Ti, Zr, V and Ca | $\leq 0.75$ |
| $TiO_2$ | 3.5–7.4 |
| $SiO_2$ | $\leq 2.0$ |
| MgO and/or $ZrO_2$ | 0.03–1.2 |
| $Al_2O_3$ | $\leq 1.5$ |
| C | $\leq 0.15$ |
| Mn | 1.2–3.0 |
| Si | 0.3–1.2 | wherein the whole hydrogen content of said wire is defined as 15 ppm $\leq H \leq (139 + 400F)$ ppm where F is the weight % of fluorine with regard to the entire wire.

2. A flux-cored wire for gas shielded arc welding according to claim 1 wherein the metal fluoride content as fluorine of said wire comprises 0.025–0.27 weight %.

3. A flux-cored wire for gas shielded arc welding according to claim 1 or 2 wherein said core comprises 10–30 weight % of the entire wire.

* * * * *